United States Patent
Ku et al.

(10) Patent No.: US 7,200,827 B1
(45) Date of Patent: Apr. 3, 2007

(54) CHIP-AREA REDUCTION AND CONGESTION ALLEVIATION BY TIMING-AND-ROUTABILITY-DRIVEN EMPTY-SPACE PROPAGATION

(75) Inventors: Tsu-Wei Ku, Cupertino, CA (US); Wen-Chung Fang, Hsin-Chu (TW)

(73) Assignee: Apex Design Systems, Inc., Santa Clara, CA (US)

( * ) Notice: Subject to any disclaimer, the term of this patent is extended or adjusted under 35 U.S.C. 154(b) by 221 days.

(21) Appl. No.: 10/843,791

(22) Filed: May 11, 2004

Related U.S. Application Data

(60) Provisional application No. 60/320,193, filed on May 14, 2003.

(51) Int. Cl.
*G06F 9/45* (2006.01)
*G06F 17/50* (2006.01)

(52) U.S. Cl. .................. 716/9; 716/2; 716/8; 716/11

(58) Field of Classification Search ............. 716/1–14, 716/19–21
See application file for complete search history.

(56) References Cited

U.S. PATENT DOCUMENTS

| | | | |
|---|---|---|---|
| 5,535,134 A * | 7/1996 | Cohn et al. ................. | 716/8 |
| 5,612,893 A * | 3/1997 | Hao et al. ................... | 716/2 |
| 5,625,568 A * | 4/1997 | Edwards et al. ............ | 716/2 |
| 5,636,132 A * | 6/1997 | Kamdar ...................... | 716/2 |
| 5,689,433 A * | 11/1997 | Edwards ..................... | 716/2 |
| 5,943,243 A * | 8/1999 | Sherlekar et al. .......... | 716/9 |
| 6,292,929 B2 * | 9/2001 | Scepanovic et al. ........ | 716/14 |
| 6,412,097 B1 * | 6/2002 | Kikuchi et al. ............. | 716/2 |
| 6,625,791 B1 * | 9/2003 | Bobba et al. ............... | 716/8 |
| 6,668,365 B2 * | 12/2003 | Harn .......................... | 716/10 |
| 2003/0217338 A1 * | 11/2003 | Holmes et al. ............. | 716/2 |
| 2003/0217346 A1 * | 11/2003 | Teig et al. .................. | 716/7 |

OTHER PUBLICATIONS

Hwang et al., Performance Analysis of Objec-Oriented Spatial Access Methods, 1994, IEEE, pp. 364-371.*
Nag et al., Post-placement residual-overlap removal with minimal movement, Jun. 1997, ACM, pp. 1-6.*
Yang et al., "Congestion Estimation During Top-Down Placement," IEEE Transaction on Computer-Aided Design of Integrated Circuit and Systems, 2002, Vo. 21, No. 1, pp. 72-80.
Alpert et al., "Free Space Management for Cut-Based Placement," Proceeding of ICCAD 2002, IEEE, 2002, pp. 746-751.
Brenner et al., "An Effective Congestion Driven Placement Framework," Prod. ISPD 2002, pp. 6-10.
Murata et al., "VLSI Module Placement Based on Rectangle-Packing by Sequence-Pair," IEEE Transaction on Compugter-Aided Design of Integrated Circuit and Systems. 1996, vol. 15. No. 12. pp. 1518-1525.

(Continued)

*Primary Examiner*—Jack Chiang
*Assistant Examiner*—Nghia M. Doan
(74) *Attorney, Agent, or Firm*—Kam T. Tam

(57) ABSTRACT

An EDA (Electronic Design Automation) process which collects and moves empty-spaces among cells on a circuit layout to one or more target areas for productive use, such as chip-size reduction and routability congestion alleviation. The process includes globally moving the empty-spaces to the target area and thereafter locally moving the empty-spaces as refinement.

10 Claims, 14 Drawing Sheets

OTHER PUBLICATIONS

Yang et al., "Routability Driven White Space Allocation for Fixed-Die Standard-Cell Placement," Proc. of International Symposium Physical Design, 2002.

Terai et al., "A New Min-Cut Placement Algorithm for Timing Assurance Layout Design Meeting Net Length Constraint," 27th ACM/IEEE Design Automation Conference, 1990. Paper 6.3, pp. 96-102.

Hu et al., "Congestion Minimization During Placement Without Estimation," IEEE, 2002, pp. 739-745.

* cited by examiner

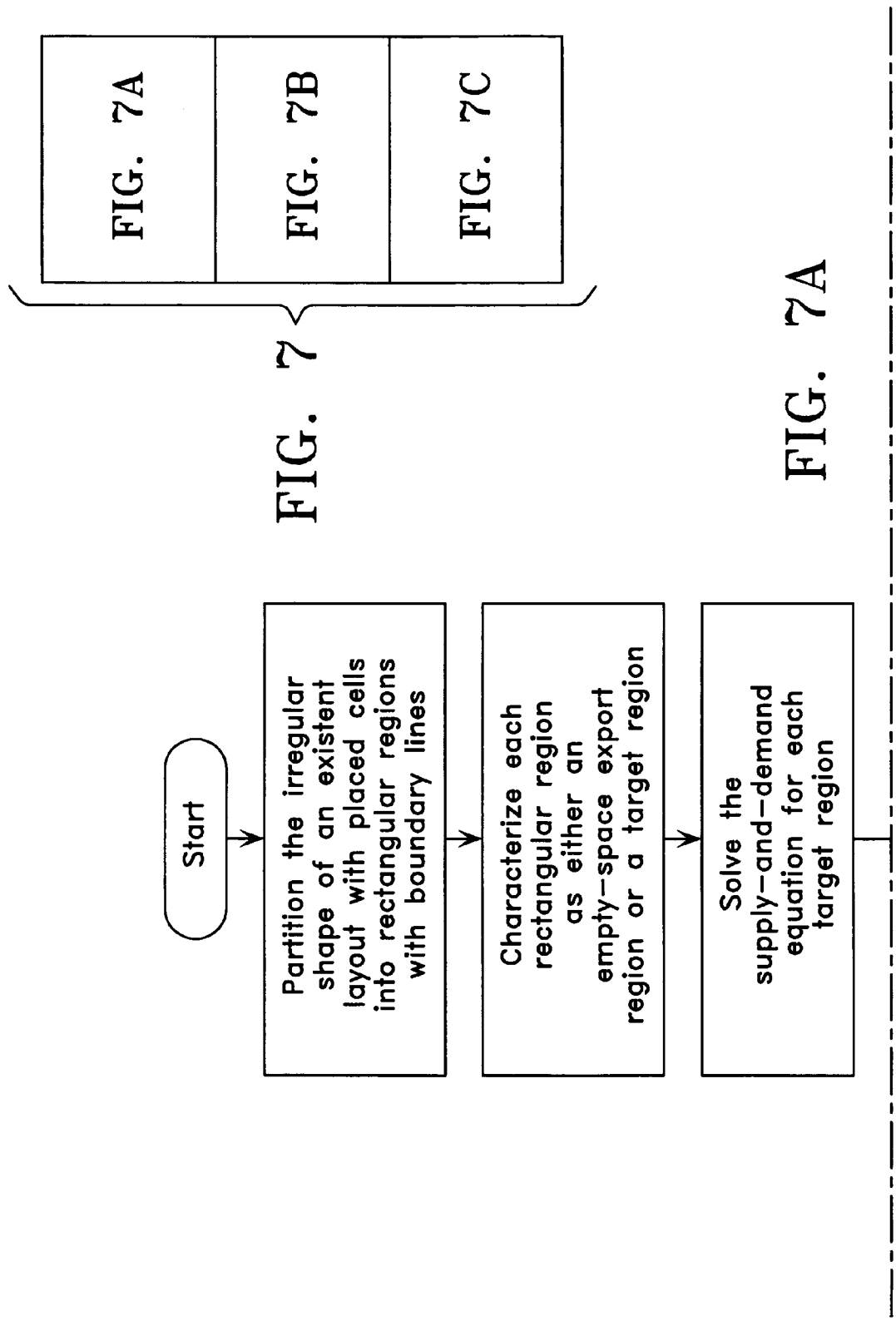

```
global_propagation {
    reglist = partition_into_regular_region()
    identify_target_space(regionlist);
    solve_supply_demand_equaiton(regionlist);
    foreach(regionlist, i) {
        if ( i satisfy supply demand ) {
            mid_cut_propagation(i);
        } else {
            neighorlist = find_neighbor_list();
            foreach(neighborlist, p) {
                propagate_space(p, i);
            }
            mid_cut_propagation(i);
        }
    }
} mincut_propgation(i)
{
    if (i too small)
        return ;
    p = find_cutline(i);
    divide_region(i, i1, i2, p);
    if (i1 satisy supply deman) {
        if (i2 satisfy supply and demand) {
            min_cut_propagtion(i2);
        } else {
            propagte_space(i1, i2);
            min_cut_propation(i2);
        }
        mid_cut_propagation(i1);
    } else {
        propgate_space(i2, i1);
        mid_cut_propagation(i1);
    }
}
```

FIG. 8

```
local_propagation()
{
    klist = identify_congestion_area();
    foreach(klist, i) {
        nlist=find_neighbor_empty_space(i);
        loop() {
            foreach(nlist, n) {
                calculate_movement_costs(n);
            }
            k=get_minimal_cost(space, method);
            move(k, method);
            if ( move_enogh_space_to(i)) break;
            nlist=find_neighbor_empty_space(i);
        }
    }
}
```

CHIP-AREA REDUCTION AND CONGESTION ALLEVIATION BY TIMING-AND-ROUTABILITY-DRIVEN EMPTY-SPACE PROPAGATION

CROSS-REFERENCE TO RELATED APPLICATIONS

This application claims the benefit of an earlier filed U.S. Provisional Application No. 60/320,193, filed on May 14, 2003, the entirety of which is incorporated herein by reference.

BACKGROUND OF THE INVENTION

1. Field of the Invention

The present invention generally relates to design of electronic circuits, and more particularly, to optimal placement and layout of circuit components in computer-aided design (CAD) of electronic circuits.

2. Description of the Related Art

The physical design of an integrated circuit (IC) includes placement of circuit components on the IC prior to fabrication. FIG. 1 is a simplified drawing of an exemplary IC floorplan signified by the reference numeral 10. The floorplan 10 corresponds to the die of the IC when fabricated. Disposed near the periphery of the floorplan 10 is a plurality of bonding pads 12. Adjacent to the bonding pads 12 is normally disposed a plurality of I/O (Input/Output) cells 14. Surrounded by the I/O cells 14 and the pads 12 are internal cells, generally signified by the reference numeral 16. If the IC is a digital circuit, the internals cells 16 may comprise basic logic gates such as NAND or NOR gates. Alternatively, the cells 16 may be formed at a higher level than the basic logic gate level such as multiplexers or registers. If the IC is an analog circuit, the cells 15 can be basic transistors or opamps (operational amplifier). Very often, hardmacros, signified by the reference numeral 18, are also placed on the floorplan 10. These hardmacros 18 are relatively large blocks of circuits serving specific functions and may include PLL (Phase Lock Loop) or USB (Universal Serial Bus) for various digital and analog applications. Occasionally, a portion of the floorplan 10 is dedicated for the layout of a custom-made circuit 20 as shown in FIG. 1. For instance, the custom-made circuit 20 may be a pre-designed microprocessor core.

The process of placing all the aforementioned components 12, 14, 16, 18 and 20 on the floorplan 10 is called placement. However, the components 12, 14, 16, 18 and 20 need to electrically communicate with each other. Signal traces such as traces 22 are distributed on the floorplan to serve such purpose. The internal cells 16 also need to communicate with one another but the linking traces are not shown in FIG. 1 for conciseness and clarity. The process of linking the components together by the traces 22 is called routing.

When the IC industry was at its infancy, ICs could be placed and routed manually. As ICs become more complex, designing ICs manually no longer can be practical. Instead, IC placement and routing are computerized and automated under a specialized field called EDA (Electronic Design Automation). CAD tools are employed to accomplish the design tasks. In designing an IC using CAD tools, one of the main objectives is to place as many cells as possible on the IC layout so that the die space can be as fully utilized as possible with minimal empty-spaces among cells.

Excessive empty-spaces among cells on the IC layout pose several disadvantages. First, the empty-spaces needlessly elongate the signal traces such as traces 22 shown in FIG. 1. Longer traces 22 entail longer signal delays and therefore degrading the overall timing performance of the IC. However, the most undesirable consequence of all is the unnecessary enlargement of the die size of the IC. An IC with a larger die size is not only more expensive to manufacture in terms of material costs but also more susceptible to random defects during fabrication, thereby resulting in lower production yield.

Thus, in the placement and routing of ICs, there are always two conflicting requirements that need to be addressed. That is, on the one hand, there is a need to reduce the die size for the benefits as aforementioned. On the other hand, too aggressive in the pursuit of die-size reduction may render the IC after placement ultimately unroutable.

A common placement scheme for reducing die size is the use of a partition-based algorithm. Specifically, the floorplan of an IC is first partitioned by partition lines into respective parts. Then, cells are placed in the partitioned parts of the floorplan. During placement, the fundamental consideration is to arrive at a smallest possible number, which is the total wire lengths of all the cells when the cells are eventually routed. To prevent the problem of ultimate unroutability, Rent's rule is used as a guide. That is, routing traffic of each cell is first roughly estimated. The estimated cells are then placed on the partitioned floorplan. However, the estimation is gross at best and very often is far off from the reality. As such, some placed cells in the resultant layout may not be routable. Such an approach is exemplified by the disclosure in a technical paper authored by Yang et al., entitled "Congestion Estimation During Top-Down Placement," IEEE Transaction on Computer-Aided Design of Integrated Circuit and Systems, Vo. 21, No. 1, pp. 72–80.

To rectify the aforementioned shortfall, that is, to ensure ultimate routability of the placed cells, an approach called the "balanced heuristic" has been suggested, as taught in a paper by Alpert et al., entitled, "Free Space Management for Cut-Based Placement," Proceeding of ICCAD 2002, pp 746–751. In such an approach, the partitioned-based algorithm is still practiced. However, constraints are placed on each partitioned portion of the floorplan to avoid extremely crowded cell placement. Nevertheless, using such an approach, very often, empty-spaces are created by the balanced decision made in the early stages of the partition and may not be utilized and further possibly left idle as unused empty die spaces in the end. The unused die spaces of the IC could have been utilized productively as an alternative, for example, for resolving routing and placement congestions.

Other schemes to ensure ultimate routability of the placed cells employ techniques such as cell padding or cell inflation. Such schemes are typified by a paper by Brenner et al., entitled, "An Effective Congestion Driven Placement Framework," Prod. ISPD 2002, pp. 6–10. These types of schemes artificially enlarge the cells prior to placement. As such, in a manner similar to Alpert et al. above, unused empty-spaces are created with the drawbacks as mentioned above.

There are schemes that address the unused empty-space in IC designs. One such scheme is disclosed in a technical paper authored by Yang et al., entitled, "Routability Driven White Space Allocation for Fixed-Die Standard Cell Placement," Proc. of International Symposium Physical Design, 2002. In Yang et al., the emphasis is on alleviating congestions of designs having fixed-die sizes. At the final stage of the partition process, empty-spaces are dynamically allocated to ease "bins" that are considered congested. A bin is a pre-defined site on the floorplan available for cell placement. The allocation of empty-spaces to each bin is extrapolated and based on the corresponding congestion information of the row or column where the bin sits. Afterward, the process of low-temperate simulated annealing is employed to patch up for the loss of placement quality during the allocation process. This approach purely depends on a temperature-cooling schedule and the acceptance ratio is not usually predictable. Furthermore, simulated annealing is a computing-power intensive process and entails a long run time. Propagating cells or empty-spaces for long distances compound the situation further.

Complexities of ICs in terms of design are ever increasing. Advances in IC fabrication technologies allow more circuit functions to be integrated per unit area of IC space. At the same time, the trend of electronic products is toward mobilization. For example, mobile telephones and PDAs (Personal Digital Assistants), require ICs to be built with high degrees of miniaturization. There is a need to provide EDA tools capable of placing and routing ICs with optimal uses of IC die spaces.

SUMMARY OF THE INVENTION

In circuit design, after the cell placement process, empty-spaces are very often found among cells on a circuit layout. The process in accordance with the invention collects and moves the empty-spaces on the circuit layout to one or more target areas for productive use, such as chip-size reduction and routability congestion alleviation.

The invention preferably involves a two-prone process, namely, global empty-space migration and local empty-space migration.

Global empty-space migration includes first locating empty-spaces on the circuit layout. Thereafter, target areas are identified. The layout is then partitioned into regions. Regions with target areas are called target regions. Regions with empty-spaces for export are called export regions. After cost analyzing, empty-spaces from selected export regions are migrated to the target regions. Afterward, repetitive partitioning and cell migrating within each region are applied until the cells are evenly distributed. Min-cut process can optionally be executed after each step of partitioning and cell migrating. A legalization process finalizes the global empty-space migration process.

Local empty-space migration refines the globally migrated empty-spaces to reposition cells for better routability. Possibly congested areas in terms of routability are first identified. Then, available empty-spaces near the congested areas are selected to migrate to the congested area for repositioning cell positions, again based on cost analyses.

BRIEF DESCRIPTION OF THE DRAWINGS

FIG. 8 is the corresponding pseudo code of FIG. 7;

DETAILED DESCRIPTION OF THE INVENTION

The following description is presented to enable any person skilled in the art to make and use the invention. Details are set forth in the following descriptions for purpose of explanation. It should be appreciated that one of ordinary skill in the art would realize that the invention may be practiced without the use of these specific details. In other instances, well-known structures and processes are shown in block diagram forms in order not to obscure the description of the invention with unnecessary details. Thus, the present invention is not intended to be limited to be the embodiments shown, but is to be accorded with the widest scope consistent with the principles and features disclosed herein.

In the following description, the process of empty-space propagation of an IC layout is first described. Thereafter, application examples utilizing the inventive method for chip-size reduction and congestion alleviation are depicted.

Empty-Space Propagation

Empty-space propagation in accordance with the invention preferably involves a two-prone process. First the identified empty-space is globally moved toward the target area. Afterward, the moved empty-space is further locally moved for fine adjustment. Hereinbelow, the process of global empty-space movement is first described followed with local empty-space movement.

Figure 1:
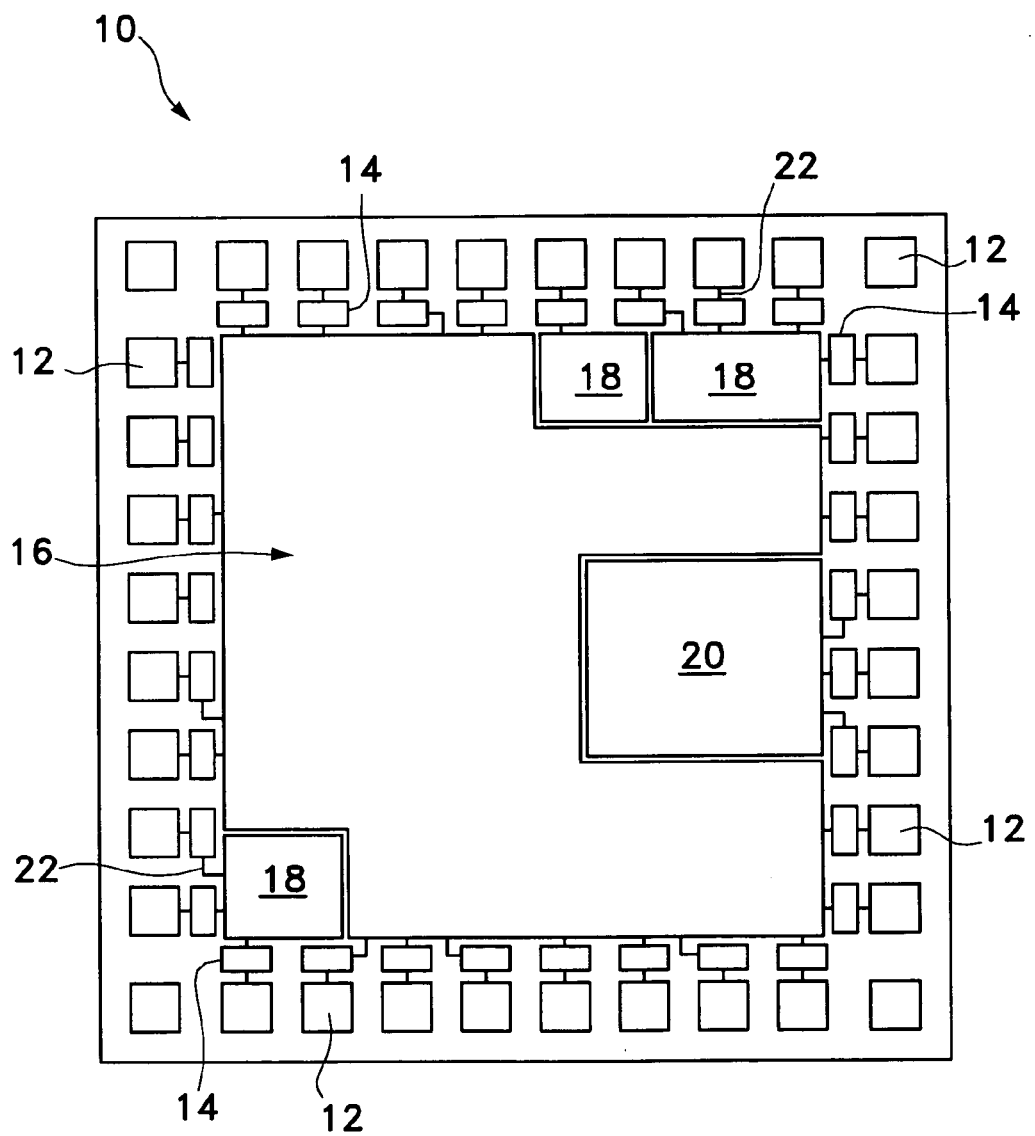
FIG. 1 is a simplified circuit layout of a typical IC based on a known placement method.
Figure 2:
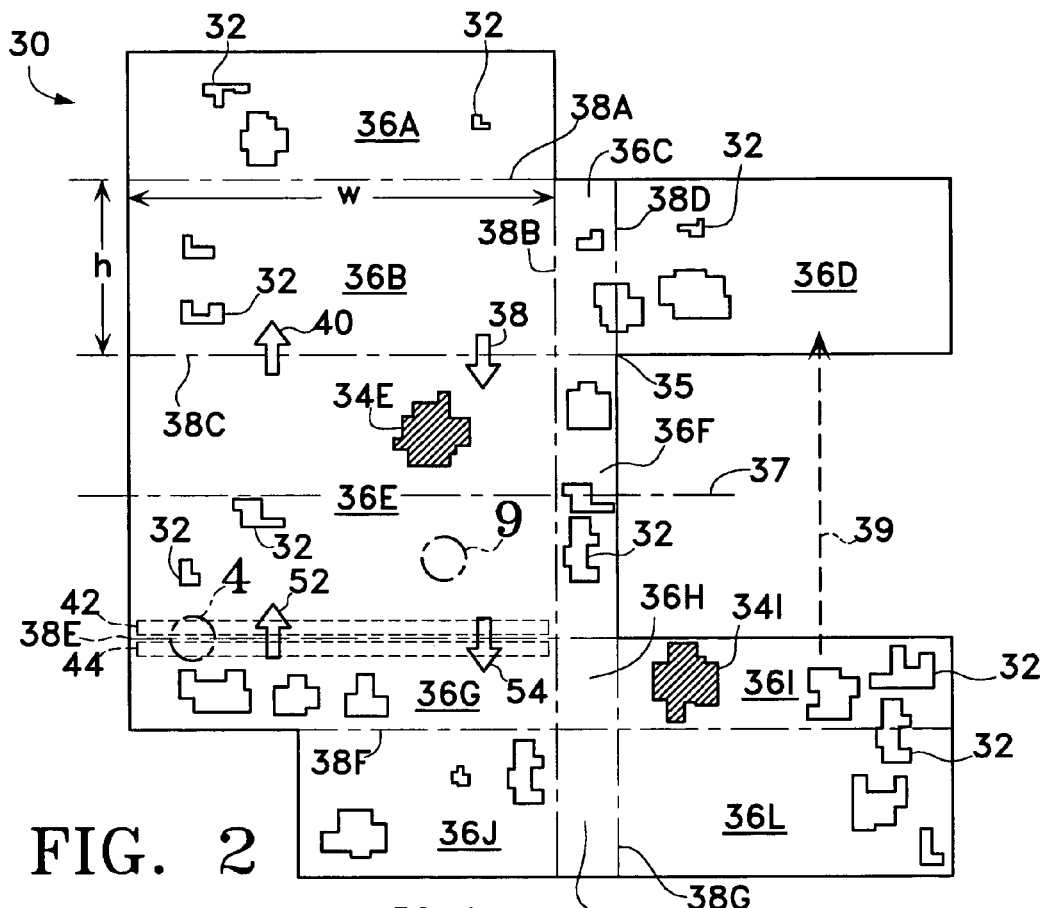
FIG. 2 shows an internal cell area of an IC having an irregular shape.

Reference is now directed back to FIG. 1. Suppose the internal cell area of a pre-placed chip is duplicated and is shown in FIG. 2. The internal cell area is now signified by the reference numeral 30. Very often, the internal cell area 30 is not fully utilized. That is, after placement, the internal cell area 30 may be riddled with a multiplicity of empty-spaces 32, with a few shown in FIG. 2. These empty-spaces 32, if the IC is fabricated, serve no benefit and could have been used for productive purposes.

The first step in the global empty-space migration process is to define one or more migration targets. The migration target area can be an area intended for die-space elimination or for alleviating routing congestion. Both applications will be described in further details later. For ease of explanation, suppose in this example, the target area is an area which is a high-traffic area in terms of signal-trace routing. That is, the target area is an area in which routing congestion is highly expected.

To identify congested areas, normally, a congestion map is first referred to. The congestion map is a plot which reports the congestion information of the placed cells when the cells are eventually routed. As with this case, based on an existent placement, such as the internal cell placement 30 as shown in FIG. 2, suppose there are two areas labeled 34E and 34I designated as target areas in which they are hatched with obliged lines. Empty-spaces are intended to migrate to the target areas 34E and 34I to alleviate the expected routing congestion.

What follows is the step of partitioning. As shown in FIG. 2, the placement 30 of the internal cells has an irregular shape. To facilitate empty-space migration, the irregular shape is partitioned into a plurality of rectangular-shaped regions, such as regions 36A–36L defined by the partition lines 38A–38G and the outer boundary of the internal cell area 30.

In this specification, the term "partitioning lines" is used generally. Occasionally, it is used interchangeably with other terms such as "boundary lines" or "cut lines." Furthermore, the term "lines" used in all the terms are not necessarily physical lines, but rather imaginary lines delineating portions of areas on a circuit layout.

There are various ways to perform the partitioning step. Preferably, every inward corner of the irregular sharp 30 is selected as a starting or end point of a partition line. For instance, the inward corner 35 is chosen as two end points of the partition lines 38C and 38D. Partitioning in this manner, region boundaries are better defined. Cells are confined to migrate only across the boundary lines 38A–38G and no other lines, such as the exterior peripheral lines of the layout 30. Restricting the partitioning and cell migration in this fashion, it facilitates empty-space migration and avoid future potential distortions.

For example, if a boundary line 37 as shown in FIG. 2 is chosen. The line 37 bisects the layout 30 into two halves. Further suppose cells are allowed to freely migrate and not only confined to across the boundary lines 38A–38G as stated above. A scenario can occur in which the cells in the target region 36I jump directly across the discontinuity to the export region 36D, as shown by the directional arrow 39. Should that occur, the migrated cells will drag along with any associated signals traces for long distances and possibly will result in significant distortions of the original placement in terms of routability and timing. On the other hand, staying with the methodology of partitioning as previously described will prevent such occurrences.

For each of the partitioned regions 36A–36L, a supply-and-demand analysis is performed. The regions with the target areas are called target regions and are analyzed first. In this case, they are regions 36E and 36I having target areas 34E and 34I, respectively. For each region 36E or 36I, if the internal empty-spaces can satisfy the demand of the target area 34E or 34I, respectively, the region is set for global empty-space migration internally without relying on any external supply of empty-spaces from neighboring regions. Mathematically, it is expressed as follows:

$$\sum_i s_i \geq (1+\alpha)\sum_i t_i \quad (1)$$

where $s_i$ is the area of the $i^{th}$ empty-space within the target region, $t_i$ is the area of the $i^{th}$ target area, and $\alpha$ is the leeway factor. If equation (1) is satisfied, migration of empty-spaces within the target region is carried out.

Thus, for example, in the region 36I, there is only one target area 34I. Taking into consideration of the leeway factor $\alpha$, the algebraic product $(1+\alpha)$ and the area of the target area 34I is the demand required. Summing up all the areas of the empty-spaces 32 within the region 36I, the sum constitutes the available supply. If the supply exceeds the demand. The supply and demand within the region 36I is self-sustaining and there is no need to import empty-spaces from neighboring regions.

On the other hand, if equation (1) is not satisfied, empty-spaces need to be imported from neighboring regions.

Take the region 36E as an example. Again, assume there is only one target area 34E which is relatively extensive in comparison with the empty-spaces within the region. Applying equation (1), the sum of all the areas of the empty-spaces 32 within the region 36E is not sufficient to meet the demand required by the target area 34E. Accordingly, empty-spaces have to be imported from one of more of the neighboring regions, 36B, 36F and 36G. For this reason, regions 36B, 36F and 36G are called export regions.

To be a candidate as an export region for exporting empty-spaces, each export region needs also be analyzed in terms of supply and demand. If the export region, after empty-space exporting, jeopardizes its own routability in the end, it will not be selected as a candidate for empty-space export. Accordingly, each export region is subject to yet another set of supply-and-demand analysis.

First, exporting empty-space means importing cells. The fundamental principle of the supply-and-demand analysis applied to each export region is to ensure that the total area of the imported cells and the total area of the existent cells are within the available area of the entire export region. Algebraically, it is expressed as follows:

$$\sum_i c_i + \sum_i d_i \leq (1+\beta)S \quad (2)$$

where $c_i$ is the area of the $i^{th}$ existent cell in the export region, $d_i$ is the area of the $i^{th}$ imported cell from the neighboring region, $\beta$ is the leeway factor, and S is the total area of the export region.

As an exemplary illustration, the supply-and-demand analysis is performed on the region 36B to determine if it is a candidate for empty-space export.

For empty-spaces 32 in the region 36B to migrate to the neighboring region 36E, there must be a corresponding influx of cells from the region 36E to the region 36B. In FIG. 2, the exporting of empty-spaces is indicated by the directional arrow 38. The corresponding opposite flow of cells is indicated by the directional arrow 40. With respect to the region 36B, if the total area of the influx cells plus the total area of the cells already existent in the region 36B exceeds the algebraic product $(1+\alpha)S$ as shown in equation (2), the region 36B will not be qualified for empty-space export. In this case, S is simply the area of the rectangular region 36B which is the product of the width w and the height h of the region 36B shown in FIG. 2.

The same analysis is applied to each of the other neighboring regions 36F and 36G.

Sometimes, empty-spaces in the neighboring regions 36B, 36F and 36G are not enough to meet the demand by the target region 36E. In that case, supply-and-demand analysis, that is equation (2), is applied to all the other export regions and not only the neighboring regions 36B, 36F and 36G. That is, in this case, the supply-and-demand analysis of equation (2) is also conducted to each of regions 36A, 36C, 36D, 36H, 36J, 36K, and 36L.

Once the available supply is determined, attention is directed back to the required demand.

Referring to the target region 36E, as we have assumed and analyzed before, internal empty-spaces within the region 36E are not sufficient to meet the need required by the target area 34E. Accordingly, empty-spaces need to be imported. The global empty-space migration process across regions will proceed once the following condition is met:

$$\sum_i s_i + \sum_k s_k \geq (1+\alpha) \sum_i t_i \quad (3)$$

where $s_i$ is the area of the $i^{th}$ empty-space within the target region 36E, $s_k$ is the area of the $k^{th}$ empty-space which is imported from neighboring regions, such as regions 36B, 36F and 36G, and the other parameters, $t_i$ is the area of the $i^{th}$ target area, such as the target area 34E, and $\alpha$ is the leeway factor, defined in the same manner as above.

The second term on the left side of equation (3), that is the summation of all the areas of the $k^{th}$ empty-space $s_k$ are empty-spaces that flow from all neighboring regions into the target region. As in this case, with respect to the target region 36E, empty-spaces can be extracted from export regions 36B, 36F and 36G, singly or in combination. However, to optimize the flow of empty-spaces, it is recommended to engage a cost analysis prior to the migration of empty-spaces.

In this example, out of the many empty-space flow scenarios from the export regions 36B, 36B and 36B into the target region 36E, each flow scenario is assigned a flow cost, FC, mathematically, it is represented as follows:

$$FC = \sum_k (s_k)^2 \quad (4)$$

where all the parameters are as defined above.

The flow scenario with the minimum flow cost FC will be chosen for empty-space migration.

Suppose in this example, it is determined that the minimum flow cost FC is from the export region 36G to the target region 36E. Moreover, in this particular case, empty-space migration from the export region 36G to the target region 36E is sufficient to meet the requirements of equation (3). As such, region 36F along with the unqualified region 36B as we assumed and analyzed earlier are left intact and excluded from the process of global empty-space migration.

After empty-space flows are analyzed and determined, empty-spaces are migrated across the boundary lines.

It should be noted the process of empty-space migration is normally conducted simultaneously throughout the cell layout 30 among all the regions. However, for ease of explanation, attention is only focused on the export region 36G and the target region 36E.

For empty-spaces to flow across the boundary line 38E from the export region 36G to the target region 36E in the direction 52, cells must flow in the opposite direction 54 from the target region 36E to the export region 36G. The amount of cells selected for migration are predetermined in accordance with equation (3). Specifically, the amount of cells required to migrate from the target region 36E to the export region 36G is the amount of cells in terms of area required to fill in the sum of all the required import empty-spaces Sk, which is the second term of the left side of equation (3).

In the target region 36E, the cells earmarked for migration in the direction 54 to the export region 36G are all near the boundary line 38E, as approximately indicated by the enclosed hidden line 42. After cell migration, the area 42 will be an area relatively depleted of cells. On the other hand, after cell migration, the area near the boundary line 38E in the export region 36G identified by the reference numeral 44 will relatively be abundantly accumulated with cells. If the migration of cells is extensive, the area 44 can be accumulated with cells having multiple levels of overlaps.

The cell overlaps in the area 44 in the export region 36G, and the layout voids in the area 42 in the target region 36E can be removed by a subsequent recursive process of intra-region partitioning and cell migration. Each cell in a CAD tool program is no more than a set of coordinates within the layout 30. That is, it is a one-dimensional point. However, each cell also has a two-dimensional area associated with it. As such, a finite area within the layout 30 can only accommodate a finite number of cells. Nevertheless, fulfillment of equations (2) and (3) guarantees each region can accommodate the cells after migration. The overlapping of cells is temporary and the intra-region partitioning and cell migrating process to be executed later serve to smooth out the cell overlaps for a more even distribution of the cells, as discussed below.

Preferably, the intra-region partition and cell migration process is carried out for all the affected target and export regions simultaneously. However, again, for purpose of explanation, only the target region 36E is highlighted for explanation.

Figure 3:
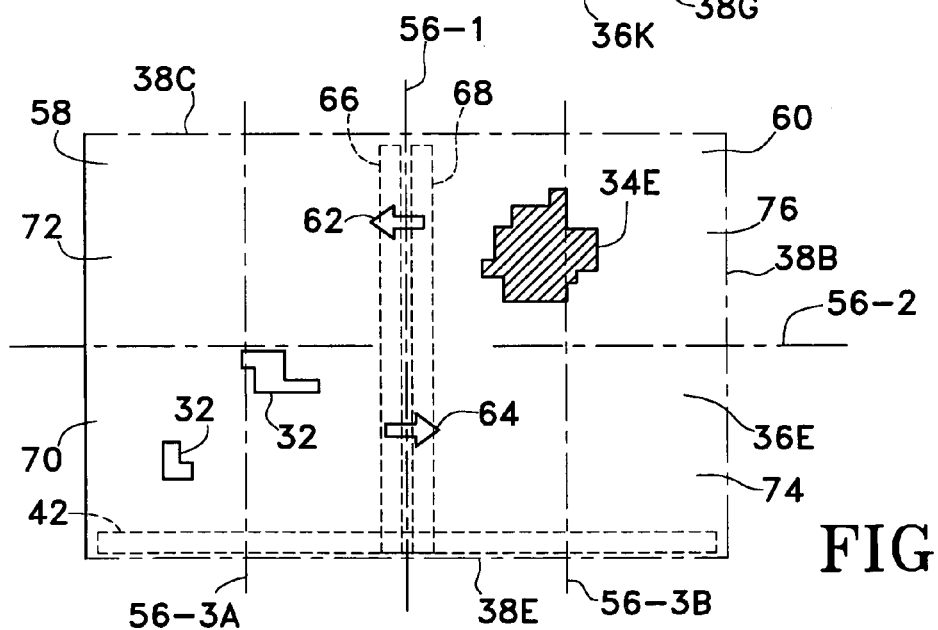
FIG. 3 is shows an isolated region of FIG. 2 undergoing a region partitioning and cell migrating process.

The targeted region 36E is isolated, enlarged, and duplicated as shown in FIG. 3. To begin with, a sequence of partition lines needs to be identified. For intra-region partitioning, the cut line should cut the region into sub-regions with the lowest aspect ratios. For instance, the first cut line should bisect the region 36E which is a rectangle at the longer side of the region 36E. The first cut line is identified by the reference numeral 56-1 as shown in FIG. 3. The two sub-regions bisected by the cut line 56-1 are signified by the reference numerals 58 and 60 as the left and right halves of the region 36E, respectively.

Thereafter, a supply-and-demand analysis in accordance with equation (2) is conducted for each of the sub-regions 58 and 60. If the analyses pass muster, then the supply and demand between the two sub-regions 58 and 60 are also determined in accordance with equation (3). In a manner similar to the inter-region migration process as described above, cells are migrated across the cut line 56-1. In this case, since the sub-region 60 includes the target area 34E, cells possibly migrate from the sub-region 60 toward the sub-region 58 in the direction 62. Phrase differently, empty-spaces possibly migrate from the sub-region 58 toward the sub-region 60 in the direction 64.

Again, in a manner similar to as described above, the region 66 enclosed by the hidden line in the sub-region 58 is mostly likely piled up with overlapping cells. At the same time, the region 68 enclosed by the hidden line in the sub-region 60 is possibly depleted of cells.

Afterward, the second cut line 56-2 is defined as shown in FIG. 3. The cut line 56-2 cuts the left sub-region 58 into two other sub-regions 70 and 72. Likewise, the cut line 56-2 cuts the right sub-region 60 into anther pair of sub-regions 74 and 76. Supply-and-demand analyses and cell migrations are applied to the sub-regions 70, 72, 74 and 76 in similar fashion as depicted above. Afterward, a third set of cut lines 56-3A and 56-3B are defined on the region 36E as shown in FIG. 3. Theoretically, the intra-region partition and migration process is recursive and it stops at the last partition which satisfies equation (1) if the region is a target region, or equation (2) if the region is an export region. In practice, to evenly distribute the cells on the layout 30, partitioning and cell migrating continue until the last sub-region encompasses the last cell. In short, the partitioning and cell migrating processes stop when the cells are evenly distributed.

Both the inter- and intra-migration processes discussed above are based on supply-and-demand analyses as the main objective. Other factors, such as cell routability should also be of consideration. An optimally placed layout should not have long detouring signal traces connecting the circuit cells. Accordingly, a "min-cut" process after each migration across a boundary line in the case of inter-region migration, or across a cut line in the case of intra-region cell migration can be employed to serve this purpose. The min-cut process is well known in the art and is used generally to shorten the overall cell-to-cell connectivity of an IC layout. An exemplary description of the mid-cut process is taught in a publication authored by Terai et al., entitled, "A New Min-Cut Placement Algorithm for Timing Assurance Layout Design Meeting Net Length Constraint," $27^{th}$ ACM/IEEE Design Automation Conference, 1990, Paper 6.3, pp. 96–102.

Figure 4:
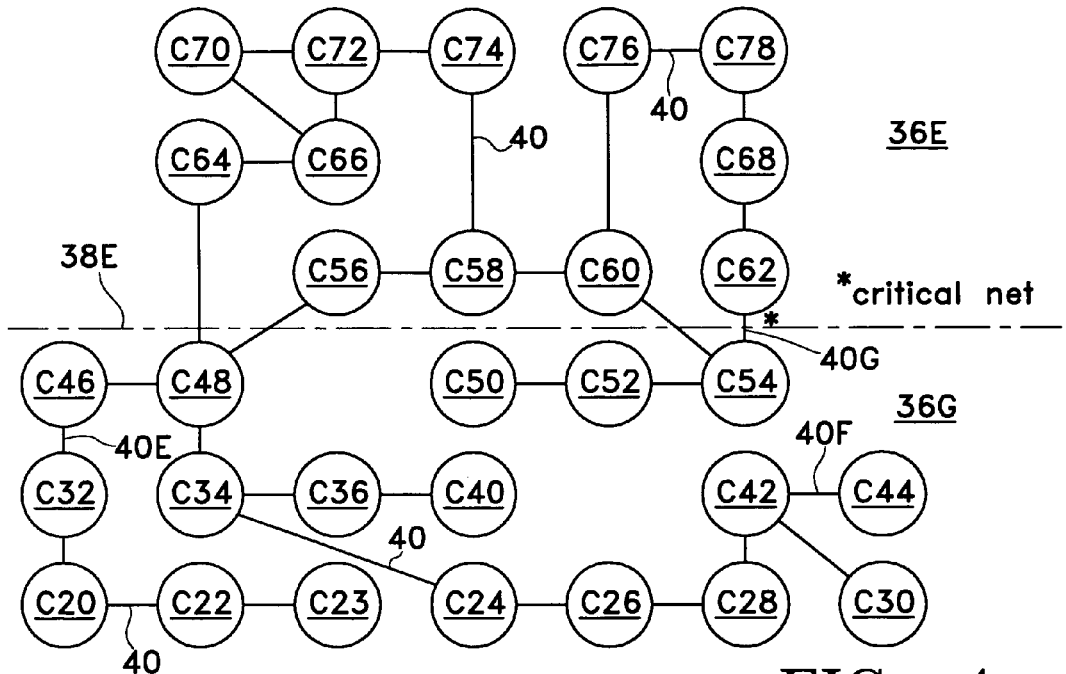
FIG. 4 is an inset figure taken within the dashed-line circle 4 of FIG. 2 and shows the cell arrangement prior to the cell migration.

For a simplified illustration of the mid-cut process, or simply called "min-cutting," attention is now directed to FIG. 4 which is an enlarged inset figure taken within the encircled area 4 of FIG. 2. As shown, the cells are linked by interconnecting traces 40. It should be noted that the traces 40 are not actual physical traces on the layer 30 at this stage of the placement process, but rather indications of cell-to-cell connections. After the routing process, these cell-to-cell connections will transform into physical signal traces.

The fundamental principle behind the mid-cut process is, based on an existent layout, to rearrange cells on both sides of a boundary line or a cut line so as to minimize the number of interconnecting traces 40 intersecting the boundary or cut line.

For example, shown in FIG. 4 is a preexistent placement of cells prior to inter-region cell migration. As shown, there are no overlapping of cells.

For inter-region migration of cells across the boundary line 38E, a supply-and-demand analysis has to perform as discussed above. Suppose in the area encircled by the number 4 as shown in FIG. 2, there is a need to migrate 7 cells across the boundary line 38E. As mentioned before, supply-and-demand is the main consideration at this juncture. In this case, cells C56, C58, C60, C62, C64, C66 and C68 near the boundary line 38E are chosen to be cells to propagate across the boundary line 38E (FIG. 4).

Figure 5:
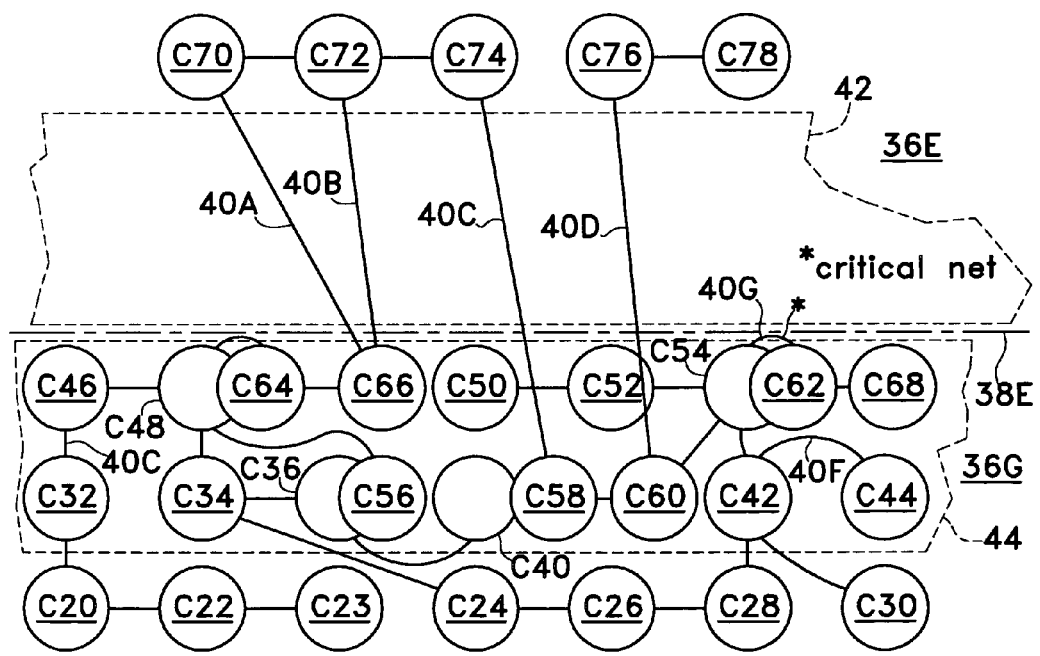
FIG. 5 is an inset figure taken within the dashed-line circle 4 of FIG. 2 and shows the cell arrangement after the cell migration.

FIG. 5 shows the locations of the cells after the migration. As can be seen, the area 42 on the target region 36E is devoid of cells while the area 44 on the export region 36G is cumulated with overlapping cells. At this point in time, the boundary line 38E intersects four signal traces, namely 40A–40D, as shown in FIG. 5.

Then the process of min-cutting is applied. If the interconnecting traces 40 can be conceptually visualized as elastic rubber bands, any of the cells along with attached interconnecting traces 40 can be moved in either side of the boundary line 38E. Under the mid-cut algorithm, the objective is to minimize the number of interconnecting traces 40 intersecting the cut line 38E as minimally as possible. In addition, the supply-and-demand numbers calculated prior to the inter-region migration process are to be preserved. That is, if the min-cut process directs a certain number of cell to move across the boundary line 38E from one side to the other, an equal number of cells should also move across the boundary line 38E in the opposite direction.

For example, in this case, as shown in FIG. 5, if the remaining 5 cells C70, C72, C74, C76 and C78 on the target region side 36E are also moved to the export region side 36G, the boundary line 38E will cuts zero signal trace which is certainly less than the 4 traces the line 38E cuts before. However, under the constraint as we mentioned, if the five cells are moved from the region 36E to the region 36G, an equal number of cells need to move in the opposite direction from the region 36G to the region 36E.

Figure 6:
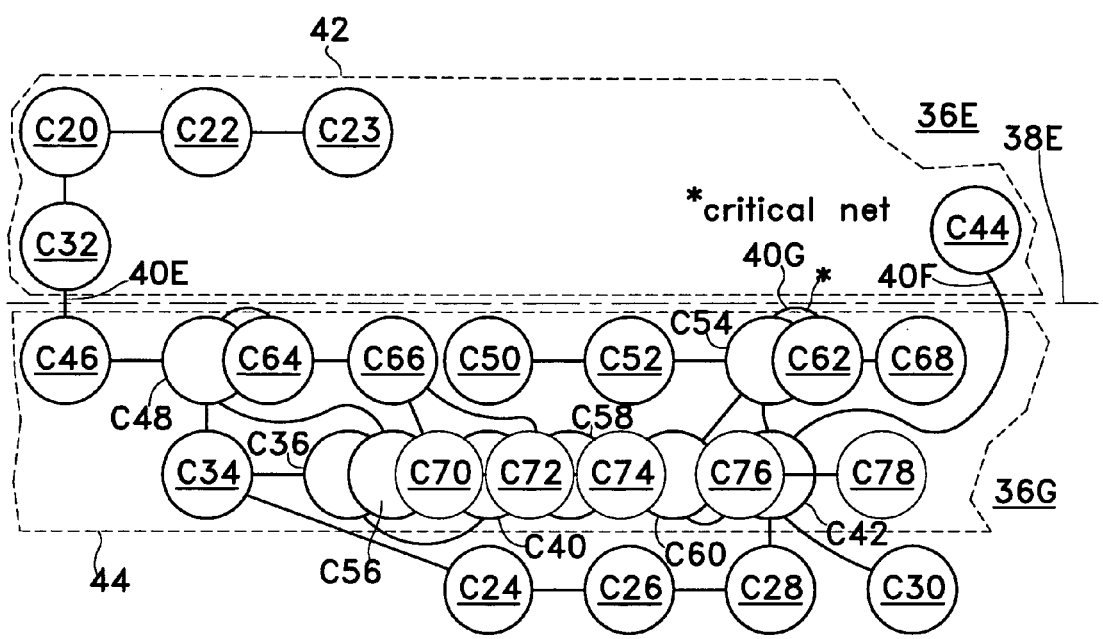
FIG. 6 is an inset figure taken within the dashed-line circle 4 of FIG. 2 and shows the cell arrangement after the min-cut process.

As shown in FIG. 6, under the constraint imposed in min-cut algorithm, the optimal arrangement is to flip 4 cells C32, C20, C22 and C23 connected to the cell C46, and another cell C44 connected to the cell C42 from the region 36G to the region 36E. Thus, the upward migration of the 5 cells as shown in FIG. 6 compensates for the downward migration of the previous 5 cells as shown in FIG. 5. This time, the boundary line 38E cuts only two traces, namely traces 40E and 40F, as shown in FIG. 6. The two cut traces 40E and 40F is less than the 4 cut traces 40A–40D prior to min-cutting. Thus, after the min-cut process, the long and ultimately meandering traces 40A–40D as shown in FIG. 5 can be avoided before the cells are actually routed.

As said before, the min-cut process can apply not only after inter-region cell migration but also after intra-region cell migration. For instance, returning to FIG. 3, the min-cut process is certainly applicable after the partitioning and cell migrating for each of the cut lines 56-1 to 56-N, where 56-N is the last cut line applied to the region 36E.

During the cell migration process and thereafter the min-cut process, cells may stray away from the intended courses. Since one of the main objectives is to preserve as much routing integrity of the preexistent placement as possible, there are two mechanisms which can be implemented to achieve the objective.

The first mechanism is to accord priority to cells linked with critical nets. A critical net is a connection between cells, which connection generally needs to be kept short to preserve critical timing requirement. For example, in FIGS. 4–6, suppose the net 40G linking the cells C54 and C62 is a critical net. The movement of the cells C54 and C62 connected by the net 40G has priority over other cells during migration. As shown in FIG. 6, under such constraint, after migration, the wire length of the net 40G is more or less preserved The second mechanism is to impose migration limits to the cells so as to assure the cells do not stray too far off from the intended course. To prevent excessive migration of a cell, migration limits can be imposed on each cell. That is, a coordinate limit can be set for each cell so as to restrain the cell not to stray beyond the set limit. For example, in FIG. 4, assume the cell C22 prior to migration has a coordinate of ($x22$, $y22$). A limit can be set for the migration of the cell C22 during the min-cut process. For instance, it can be specified that C22 cannot stray away from its original position more than an incremental distance of Δm toward the left. Likewise, another restraint can be imposed in the y-direction such that the cell C22 cannot deviate from the original y-direction in the amount of Δn either upwardly or downwardly. Thus, the settled position of the cell C22 after the mid-cut procedure must be within the following coordinate limit:

$$(x22-\Delta m, y22\pm\Delta n) \quad (5)$$

from the original coordinate of:

$$(x22, y22) \quad (6)$$

In a similar fashion, each of the cells that is to be moved can also be assigned migration limits of ±Δm in the x-direction and ±Δn in the y-direction.

After the completion of both the inter-region and intra-region cell migration processes, there are possible multiple cell overlaps on the layout. The overlaps can be removed by a legalization process which basically is a procedure to rearrange the coordinates of the cells taken into consideration that each cell also has a two-dimensional area. After the legalization procedure, the process of global empty-space propagation is said to be complete.

Figure 7B:
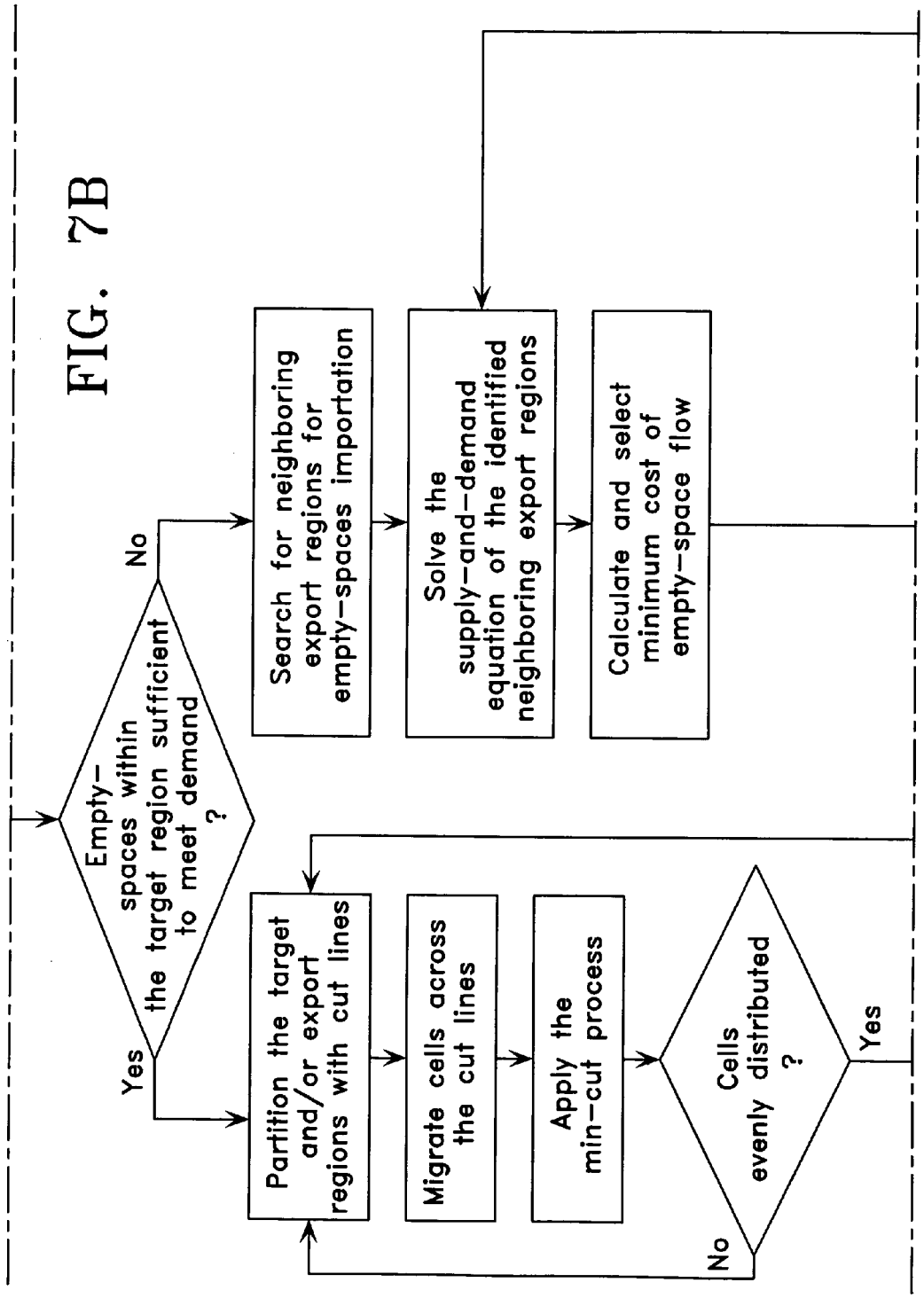
FIG. 7 is a flowchart which shows the steps of the global empty-spaces migration process.
Figure 7C:
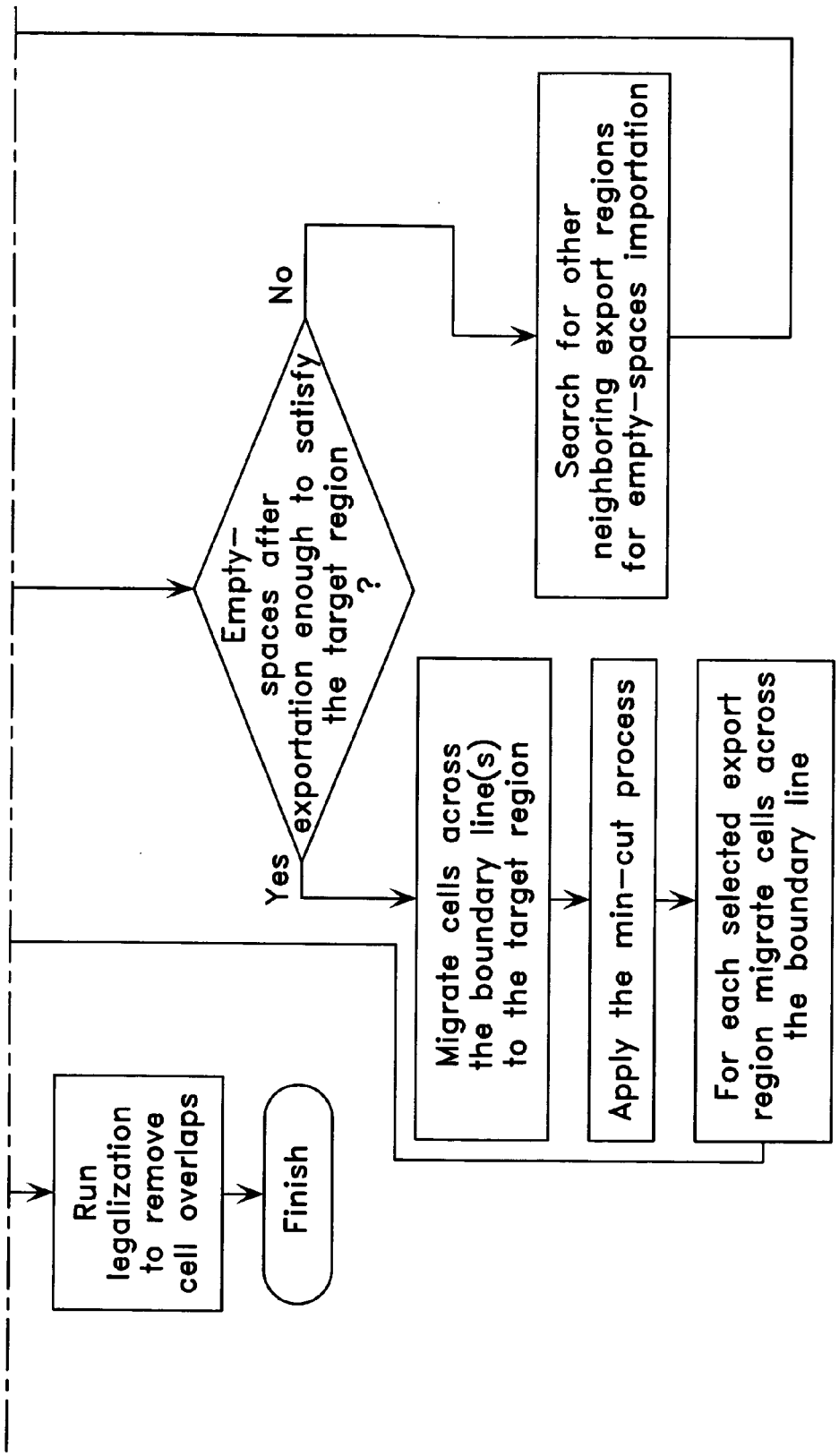

The global empty-space movement is summarized in a flowchart as shown in FIG. 7. The corresponding pseudo code is shown in FIG. 8.

After the legalization step, a new routability analysis is performed. Since placement after global empty-space propagation is different from the original placement, routability behavior is thus accordingly somewhat different from the original placement. There may even be routability violations introduced. The routability violations may be repaired by a procedure called "local empty-space propagation" as described below.

Figure 9:
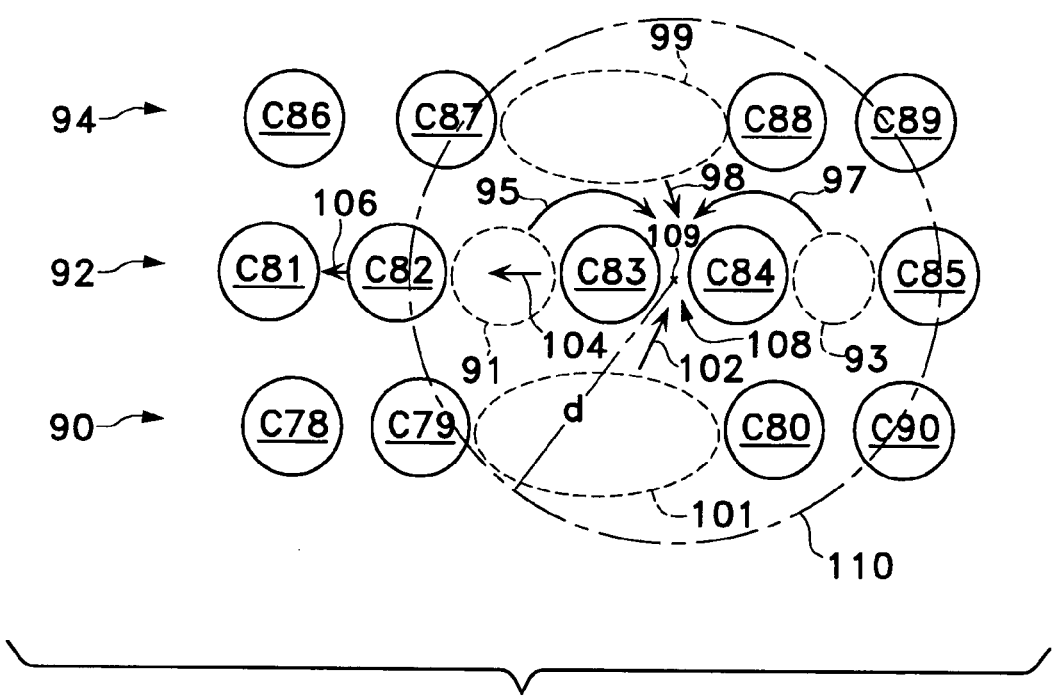
FIG. 9 is an inset figure taken within the dashed-line circle 9 of FIG. 2 and shows an exemplary movement of empty-spaces undergoing the local empty-space migration process.

Areas that require repair first need to be identified. Suppose the cells in an area encircled by the ghost line circle labeled 9 in FIG. 2 have been moved. The enlarged drawing of the area 9 is shown in FIG. 9. The cells have been moved due to the intra-region partitioning and cell migration as part of the global empty-space movement, as described previously. Further suppose that after the legalization process, the routability analysis indicates that the cell C84 shown in FIG. 8 has several routability violations. That is, after the routability analysis, some routing traces communicating with the cell C84 may violate certain routing rules or even unroutable. For this reason, small amount of empty-spaces may need to migrate to the surrounding of the cell C84 to ease the expected routing congestion.

There are several options available to meet this need. As an illustration, for example, within the cell row identified by the reference numeral 92, empty-space 91 between the cell C82 and C83 may migrate toward the right adjacent the congested cell C84. The possible migration path is identified by the directional arrow labeled 95. Likewise, empty-space 93 between the cells C84 and C85 can propagate to the left toward the congested area adjacent the cell C84, as shown by the arrow 97.

Empty-spaces can also travel across cell rows. For instance, empty-space 99 between the cells C87 and C88 in the cell row 94 can travel downward toward the congested area near the cell C84 as indicated by the arrow 98. In a similar manner, empty-space 101 may be shifted upward among cell rows as exemplified by the upward movement of the empty-space 101 between the cells C79 and C80 toward the congested cell C84 in the direction indicated by the arrow 102.

Empty-spaces can also be created by packing cells closer together. In FIG. 8, by moving the cell C83 and C82 toward the cell C81 in the cell row 92 in the directions 104 and 106, respectively, empty-space 108 adjacent the congested cell C84 can be created.

In deciding which empty-space to move to the vicinity of the congested area, it is preferable to use cost analysis as basis for decision. The space that has the least moving cost will be selected for movement. The methodology of cost-analyzing is described in the following paragraphs.

Reference is now directed back to FIG. 9. First, the congested area needs to be identified. That is, the destination point for the empty-space movement needs first be located. In this case, it is between the cell C83 and C84 centered at the point 109. Then, a boundary circle is drawn to include all empty-spaces which can possibly be moved. The boundary circle is signified by the reference numeral 110 with a radius r centered at the point 109 as shown in FIG. 9. Here, the movable empty-spaces are the spaces 91, 93, 99, 101, and 108 as described above. For purpose of explanation, one possible move is highlighted and elaborated.

In FIG. 9, suppose the empty-space 91 between the cells C82 and C83 moveable in the direction 95 is selected for movement. For the empty-space 91 between cell C82 and C83 to move, the cells surrounding the space 91 need to be moved. Movement of each cell, Ci, involves a cell moving cost, $MC_{Ci}$ which is defined as follows:

$$MC_{Ci}=(np_i-p_i)^2 \quad (7)$$

where $np_i$ is the moved or new position of the cell $C_i$ and $p_i$ is the current position of the cell $C_i$. In order to minimize the original relative positions of the cells as much as possible, the minimum of the sum of all the moving costs of all the cells is sought. More specifically, in this case, for each possible move scenario, the moving cost of each of the movable cells, C82, C83, C79 and C87 is calculated. Then total cell moving costs are summed together as Total $MC_{Ci}$. Mathematically, it is expressed as follows:

$$\text{Total } MC_{Ci} = \sum_i (np_i - p_i)^2 \quad (8)$$

The calculations are performed recursively until the lowest Total $MC_{Ci}$ is found. Cost determination is well-known in the art and is a NP (Non-deterministic Polynomial) problem. A heuristic algorithm can be used to arrive at a solution. As an alternative, for a speedier outcome, a greedy algorithm can be sued to approximate the solution.

Other than the aforementioned costs incurred by the cell movements in deciding a particular empty-space to be moved, there are other factors that need to take into consideration. For instance, the area of the empty-space to be moved is one factor. The larger the area of the empty-space, the better it is as a candidate for movement. Furthermore, the criticality of the nets linking to any of the cells is also another factor. Taking these factors into consideration, a parameter called the Total Cost can be expressed in the following expression:

$$\text{Total Cost} = \sum_i (np_i - p_i)^2 + wS + nL \quad (9)$$

where w is the weight factor assigned to the empty-space in comparison with the other two terms on the right side of equation (9), S is the area of the empty-space, n is the weight factor for the change in wire length in comparison with the other two terms on the right side of equation (9), and ΔL is the total change in wire lengths of all the moved cells.

After the congested area around the destination point 109 is filled with locally moved empty-space, another area is selected and the entire process of local empty-space migration repeats itself. However, for each execution of the process, the cost calculations of equations (7) to (9) must be updated.

Figure 10:
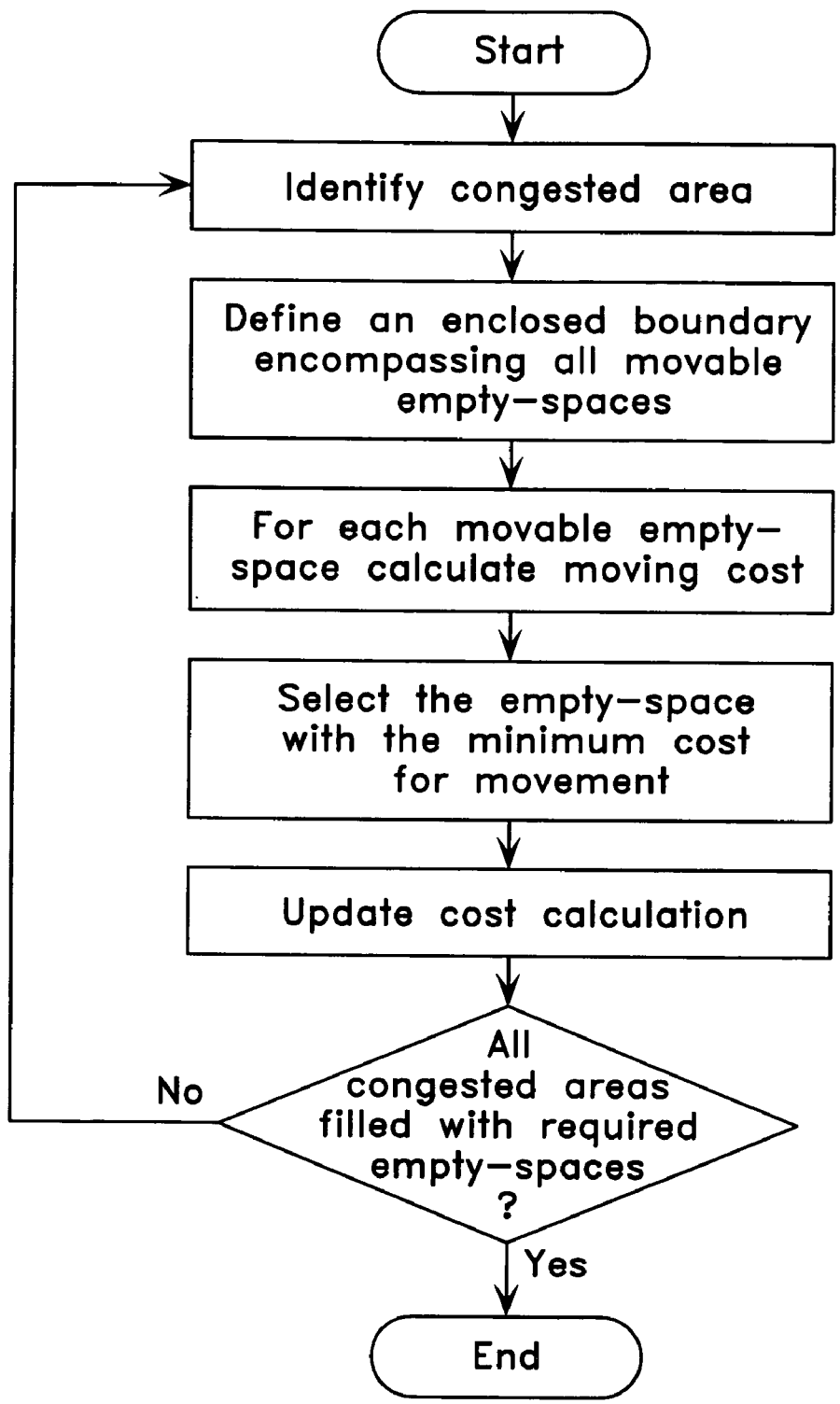
FIG. 10 is a flowchart which shows the steps of the local empty-spaces migration process.
Figure 11:
FIG. 11 is the corresponding pseudo code of FIG. 10.

The local empty-space movement is summarized in a flowchart as shown in FIG. 10. The corresponding pseudo code is shown in FIG. 11.

Applications

The method described in accordance with the invention is applicable for reducing chip sizes and for alleviating routing congestions. The process of chip-size reduction is first depicted followed with the description of routing congestion alleviation.

Figure 12:
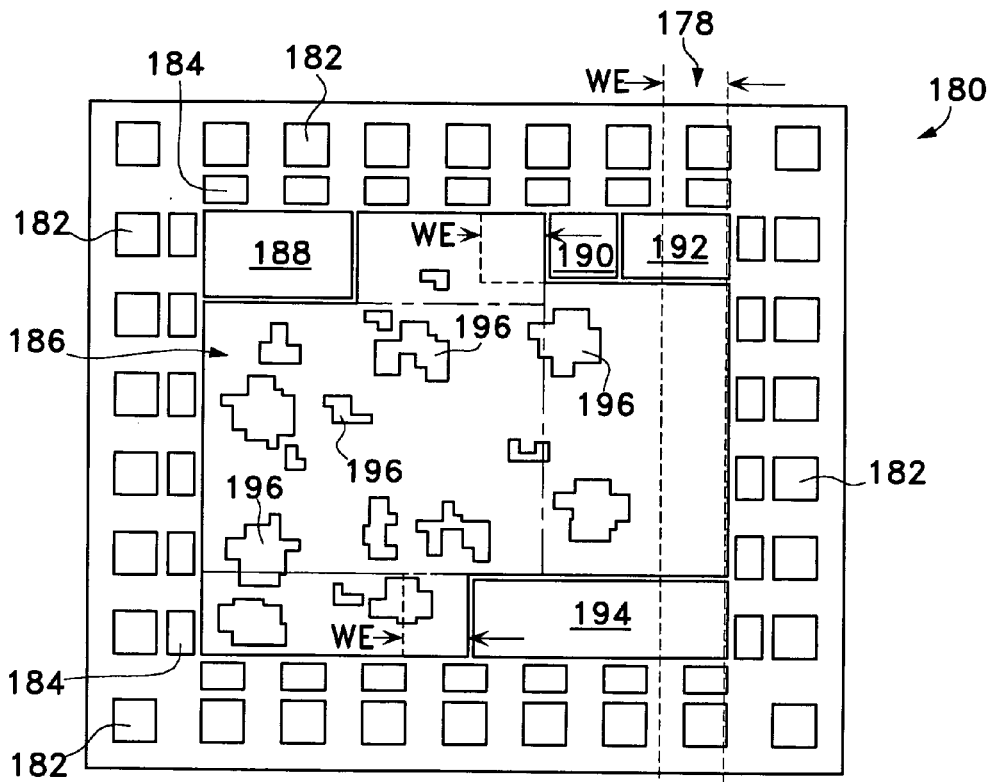
FIG. 12 shows a simplified IC layout prior to the chip-size reduction process.

Reference is now directed to FIG. 12 which shows a layout of a circuit after the process of cell placement. The layout is generally signified by the reference numeral 180. Disposed on the periphery of the layout 180 is a plurality of bonding pads 182. There are also I/O cells 184 buffering between the bonding pads 182 and the internal cells designated by the reference numeral 186. In addition, hardmarcos 188, 190, 192 and 194 are distributed and interposed in the internal cell area 186.

Suppose in this example, there is a number of empty-spaces 196 scattered all over and interposed within the internal cells area 186, as shown in FIG. 12. The goal of chip-size reduction is to collect, merge and then eliminate the empty-spaces as part of the scaled-down chip size.

Suppose in this case, a strip of area designated by the reference numeral 178 is designated to be eliminated as part of the reduced die-size. The area 178 has a width WE as shown in FIG. 12. It should be noted that in this case, some hardmacros, such as hardmacros 192 and 194, also sit on the area 178. To clear room of the area 178, the occupying hardmarcos 192 and 194 have to move.

To maintain the relative locations of the hardmacros so that timing and routability behaviors are disturbed minimally, the hardmacros are preferably moved relative to one another. Thus, for example, in FIG. 12, for the hardmacro 192 to clear away from the area 178, it is preferred to have the adjacent hardmacro 190 to move along together. That is, in this particular case, hardmacros 190 and 192 should be moved in tandem together to the left away from the area 178 at a distance WE.

The other hardmacro 194 also needs to clear away from the area 178. Since the hardmacro 194 has no other adjacent hardmacros, it can simply move to the left away from the area 178 at a distance WE.

What follows is the partition of the internal cell area 186 into rectangular regions. For purpose of clarity in explanation, the internal cell area 186 is isolated and duplicated as FIG. 13.

Figure 13:
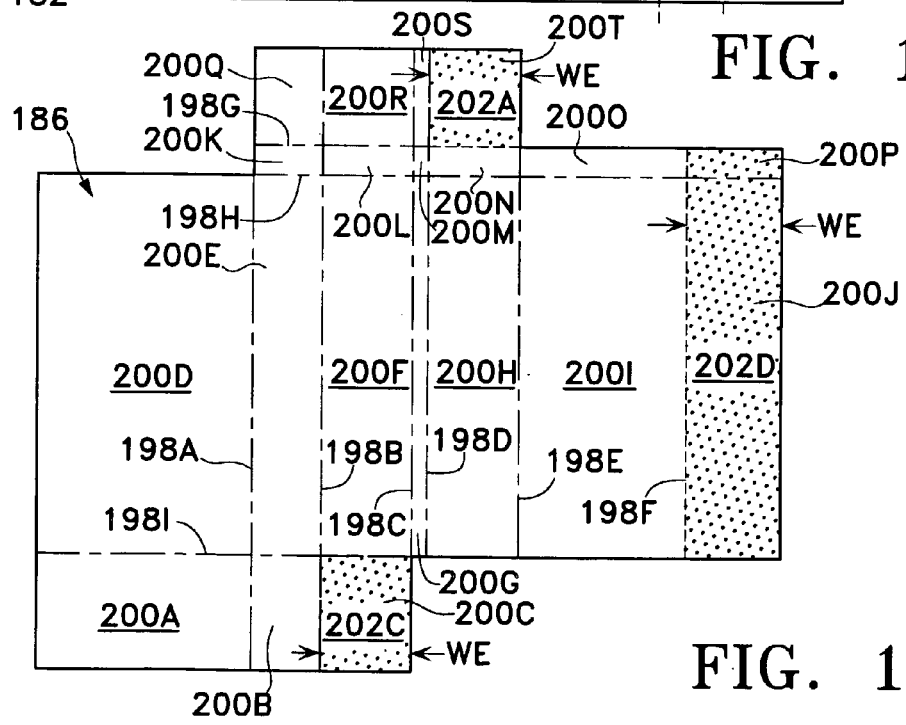
FIG. 13 shows the internal core area of the IC shown in FIG. 12 undergoing the region-partitioning process.

As can be seen from FIG. 13, the internal cell area 186 is irregular in shape. Adhering to the principle that each inward corner should be designated as the starting point or ending point of a partition line, a plurality of boundary lines 198A–198I are defined partitioning the irregular internal cell area 186 into rectangular regions 200A–200T.

Next, each of the regions 200A–200T needs to be determined whether it is a target region or an empty-space export region. As shown in FIG. 13, the target areas where empty-spaces need to migrate to are areas 202A in region 200T, 202C in region 200C, and 202D in regions 200P and 200J. Thus, regions 200T, 200P, 200J and 200C are designated as target regions. Furthermore, in this case, the target areas 202A and 202C coincide with the target regions 200T and 200C, respectively. The target area 202D sits on two target regions 200P and 200J.

For regions other than the target regions 200T, 200P, 200J and 200C, there are no target areas and are thus characterized as empty-space export regions.

For each of the target regions 200T, 200P, 200J and 200C, the supply-and-demand analysis of equation (1) is dispensed with because all the regions 200T, 200P, 200J and 200C need importing of empty-spaces. Phrased differently, for each of the target regions 200T, 200P, 200J and 200C, after the supply-and-demand analysis of equation (1), since supply of empty-spaces is zero, supply cannot meet demand and empty-spaces have to be imported.

Then supply-and-demand analysis is performed on each of the export regions, 200A, 200B, 200D to 200I, 200K to 200O, and 200Q to 200S.

Afterward, for each of the target region 200T, 200P, 200J and 200C, supply-and-demand analysis of equation (3) is performed with respect to the neighboring regions. After the minimal cost of equation (4) is determined, the process of global empty-space migration can proceed. The process of local empty-space migration is then executed as the final placement refinement. The processes have been explained before and are not further repeated.

Figure 14:
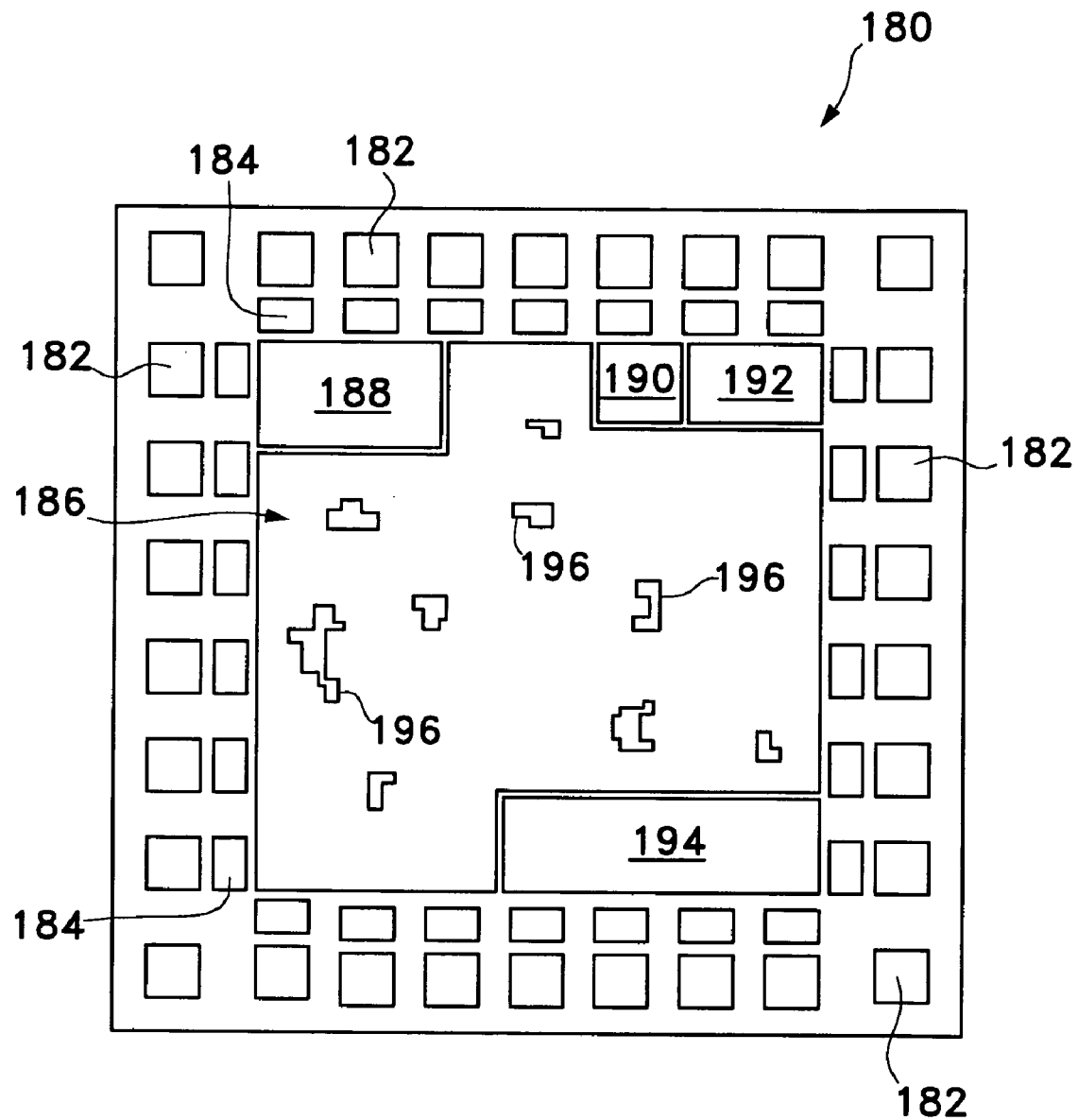
FIG. 14 shows the IC layout of FIGS. 12 and 13 after chip-size reduction.

The next task to tackle is the packing together of bonding pads 182 and I/O cells 184. Very often, the bonding pads 182 have their own set of spacing and placement rules. Likewise, the I/O cells 184 may have their own sets of rules to follow. Without altering the relative locations of the bonding pads 182 and I/O cells 184, on the floorplan of the layout 180, the area 178 is to be eliminated as part of the die-size reduction. The significant move is the movement of the I/O cells 184 and bonding pads 182 located on the right edge of the layout 180. The movement distance is the distance spanned by the width WE of the area 178. In this case, the other I/O cells 184 and bonding pads 182 can be proportionally slightly packed closer together. The layout 80 after the chip-size reducing process may appear as shown in FIG. 14.

Figure 15:
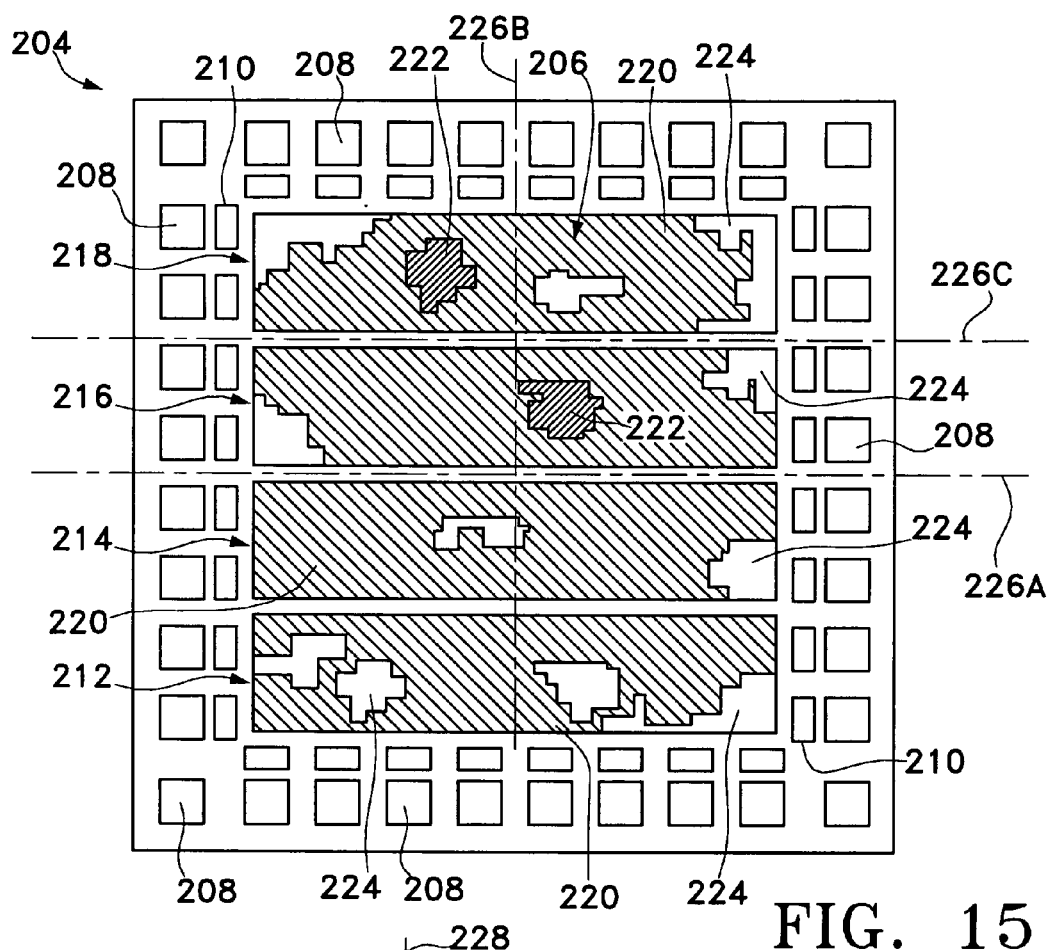
FIG. 15 shows another simplified IC layout prior to the congestion alleviation process.
Figure 16:
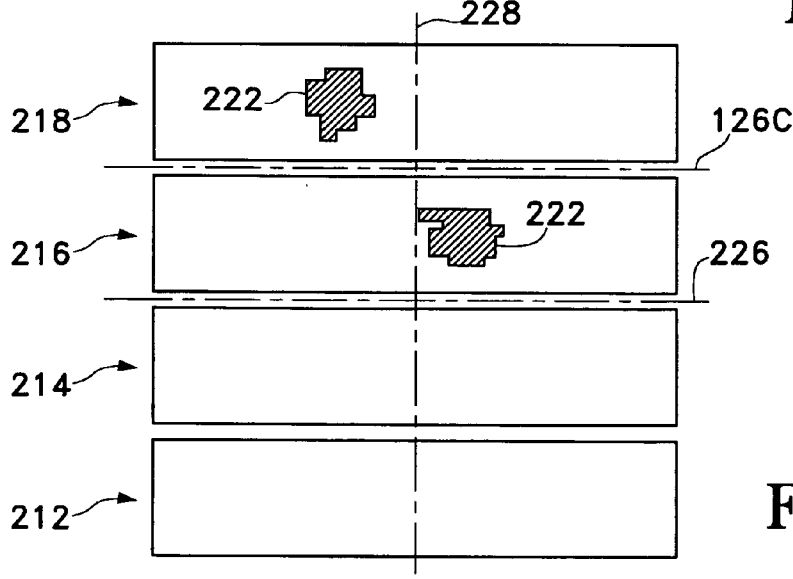
FIG. 16 shows the internal core area of the IC shown in FIG. 15 undergoing the region-partitioning process.

FIG. 15 shows the process of use of the inventive method in according with the invention to alleviate routability congestion. The circuit layout shown in FIG. 15 is signified by the reference numeral 204. Suppose the layout 204 is a PGA (Programmable Gate Array) in which the circuit elements such as basic transistors are pre-placed. That is, bare elements of a preprogrammed circuit are prefabricated on an IC die. A specific circuit can be "programmed" by electrically wiring the bare elements together. Because the semiconductor elements are pre-built, PGAs are fixed-die designs. Basic circuit building blocks, such as NAND gates and OR gates, can be formed by the linking the circuit elements together. The building blocks in this example are called cells 206 on the layout 204. Circuits can be designed by linking the pre-placed cells 206 together. The PGA also has bonding pads 208 and I/O cells 210 disposed on the periphery of the layout 204. A custom circuit can be made by a fabrication process called metalization which is the procedure of designing a set of masks for wiring the pre-placed cells together.

The design of the metalization masks has to go through the cell placement and routing processes. Suppose the cells 206 are placed on the cell rows 212, 214, 216 and 218. Further suppose that the lightly hatched areas 220 in the rows 212, 214, 216 and 218 are placed with cells of normal congestion in terms of routability. The heavily hatched areas 222 of the rows 216 and 218 are placed with cells of high routability congestion. The areas that are not hatched for the rows 212, 214, 216 and 218 are empty-spaces 224.

As with the process of chip-size reduction described above, global empty-space movement is first employed to move the empty-spaces to the destination areas followed with local empty-space movement for refinement.

Even though there is no irregular shape associated with the layout 204, to map out the overall empty-space migration strategy in advance, it is preferable to partition the layout 204 regardless.

For instance, the first partition line can be 226 which bisects the internal cells 206 of the layout 204 into halves. The region with upper rows 216 and 218 can be treated as a target region. Likewise, the region with the lower rows 212 and 214 can be treated as an empty-space export region. Empty-spaces from below can globally migrate to above across the boundary line 226. Thereafter, multiple partition lines starting with the line 228 can be inserted for the intra-region cell migration in a manner similar to as described above. The remaining process of local empty-space migration is also substantially the same as previously described. For the sake of brevity and clarity, both the global and local empty-space migration processes are not further repeated.

Alternatively, lines 226 and 228 can be treated as two boundary lines dividing the layout 204 into 4 quadrants of equal areas. The upper two quadrants with the two target areas 222 can be treated as two target regions while the lower two quadrants can be treated as the empty-space export regions.

It should be noted that if available, move leeway should be applied to the congested areas 222 when allocating empty-spaces such that the final routability of the congested areas 222 are more assured. That is, the parameters α and β in equations (1) to (3) above should be assigned higher values if final routability is to be ensured.

The invention described above includes many specificities, which should not be construed as limiting the scope of the invention but merely as illustration. Changes are possible within the scope of the invention. For example, other than for the applications of die-size reduction and routing congestion alleviation, the inventive process can be used for alleviating heat dissipation of an IC. In this case, instead of a routability report, a heat-dissipation report can be made available to identify the potential hot spots of an IC layout. The potential hot spots can be treated in the same manner as routing-congested spots as described previously and empty-spaces can migrate to the hot spots in accordance with the invention. Furthermore, the min-cut process can be dispensed with, for instance for circuits which timing is not important. It will be understood by those skilled in the art that these and other changes in form and detail may be made therein without departing from the scope and spirit of the invention. Finally, all publications cited in this specification are herein incorporated by reference in their entireties as if each individual publication were specifically and individually incorporated.

What is claimed is:

1. A method of designing an integrated circuit having a layout of circuit cells interposed with empty-spaces, comprising the steps of:
   (a) identifying on said layout at least one target area for receiving empty-spaces;
   (b) partitioning said layout by a plurality of partitioning lines; and
   (c) recursively migrating said empty-spaces across said plurality of partitioning lines toward said target area, including:
      (i) identifying at least one potentially congested area on said layout;
      (ii) defining a predetermined area surrounding said potentially congested area;
      (iii) cost-analyzing possibly movable empty-spaces within said predetermined area; and
      (iv) moving empty-spaces to said potentially congested area based on analyzing result of sub-step (iii).

2. The method as in claim 1 wherein step (c) includes corresponding migrating of some of said circuit cells within predetermined coordinate limits.

3. The method as in claim 1 wherein step (c) includes corresponding migrating of said circuit cells with migrating priority set to some of said circuit cells having critical nets.

4. A method of designing an electronic circuit having a layout of circuit cells interposed with empty-spaces, comprising:
   partitioning said layout into a Plurality of regions;
   identifying at least one of said regions as a target region having a target area for receiving empty-spaces;
   identifying at least another of said regions as an empty-space export region;
   migrating empty-spaces from said export region to said target region;
   recursively partitioning and migrating empty-spaces within said target region until empty-spaces reach said target area;
   locally migrating empty-spaces on said layout after said partitioning and migrating for facilitating routability of said circuit cells of said circuit, including:
      identifying at least one potentially congested area on said layout;
      defining a predetermined area surrounding said potentially congested area;
      cost-analyzing possibly movable empty-spaces within said predetermined area toward said potentially congested area; and
      moving empty-spaces to said potentially congested area based on said cost-analyzing.

5. A method of designing an electronic circuit having a layout of circuit cells with empty-spaces disposed therebetween, comprising:
   (a) partitioning said layout into a Plurality of regions;
   (b) identifying at least one of said regions as a target region having a target area for receiving empty-spaces;
   (c) identifying at least another of said regions as an empty-space export region;
   (d) evaluating within said target region supply of empty-spaces with respect to demand of empty-spaces by said target area;
   (e) migrating within said target region empty-spaces toward said target area after step (d) and recursively partitioning and migrating empty-spaces within said target region afterward if said supply exceeds said demand by said target area;

(f) migrating empty-spaces from said export region to said target region after step (d) if said demand by said target area exceeds said supply; and (g) locally migrating said empty-spaces, including:
  (i) identifying at least one potentially congested area in said target region;
  (ii) defining a predetermined area surrounding said potentially congested area;
  (iii) cost-analyzing possibly movable empty-spaces within said predetermined area; and
  (iv) moving empty-spaces to said potentially congested area based on analyzing result of sub-step (iii).

6. A method of designing an electronic circuit having a layout of circuit cells with empty-spaces disposed therebetween, comprising:

(a) partitioning said layout into a plurality of regions;

(b) identifying at least one of said regions as a target region having a target area for receiving empty-spaces;

(c) identifying at least another of said regions as an empty-space export region;

(d) evaluating within said target region supply of empty-spaces with respect to demand of empty-spaces by said target area;

(e) migrating within said target region empty-spaces toward said target area after step (d) and recursively partitioning and migrating empty-spaces within said target region afterward if said supply exceeds demand by said target area;

(f) migrating empty-spaces from said export region to said target region after step (d) if said demand by said target area exceeds said supply, including, recursively partitioning and migrating empty-spaces within said target region until empty-spaces reach said target area, and recursively partitioning and migrating empty-spaces within said export region until circuit cells in said export region are evenly distributed; and (g) locally migrating said empty-spaces, including:
  (i) identifying potentially congested areas on said layout;
  (ii) defining predetermined areas surrounding said potentially congested areas;
  (iii) cost-analyzing possibly movable empty-spaces within said predetermined areas; and
  (iv) moving empty-spaces to said potentially congested areas based on analyzing result of sub-step (iii).

7. A method of designing an electronic circuit having a layout of circuit cells with empty-spaces disposed therebetween, comprising:

(a) partitioning said layout into a plurality of regions;

(b) identifying at least one of said regions as a target region having a target area for receiving empty-spaces;

(c) identifying at least another of said regions as an empty-space export region;

(d) evaluating within said target region supply of empty-spaces with respect to demand of empty-spaces by said target area;

(e) migrating within said target region empty-spaces toward said target area after step (d) if said supply exceeds said demand by said target area; and (f) cost-analyzing of migrating of empty-spaces from said export region to said target region and thereafter migrating empty-spaces from said export region to said target region based on result of said cost-analyzing if said demand by said target region exceeds said supply.

8. A method of designing an electronic circuit having a layout of circuit cells interposed with empty-spaces, comprising:

identifying on said layout at least one target area for receiving empty-spaces;

partitioning said layout into a plurality of regions;

characterizing a region having said target area as a target region;

analyzing and comparing costs of migrating empty-spaces from others of said regions to said target region;

migrating empty-spaces from others of said regions to said target region based on said analyzing and comparing;

recursively partitioning and migrating empty-spaces in said target region and others of said regions;

recursively min-cutting said circuit cells during said partitioning and migrating of empty-spaces;

identifying at least one potentially congested area on said layout;

applying cost analysis on possibly movable empty-spaces adjacent said potentially congested area; and moving empty-spaces to said potentially congested area based on said cost analysis.

9. The electronic circuit designed by the method of claim 8.

10. The method as in claim 8 wherein said migrating of empty-spaces in said target region and others of said regions includes corresponding migrating of some of said circuit cells within predetermined coordinate limits and further with migrating priority set to some of said circuit cells having critical nets.

* * * * *